(12) United States Patent
Kore et al.

(10) Patent No.: US 8,571,064 B2
(45) Date of Patent: Oct. 29, 2013

(54) METHOD AND APPARATUS FOR PHYSICAL LAYER ROUTING IN A WIRELESS DEVICE (75) Inventors: Vinayak S. Kore, Bangalore (IN); Gourango Biswas, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 836 days.

(21) Appl. No.: 12/060,363

(22) Filed: Apr. 1, 2008

(65) Prior Publication Data

US 2009/0245286 A1 Oct. 1, 2009

(51) Int. Cl.
*H04J 3/16* (2006.01)
(52) U.S. Cl.
USPC ........................................................ 370/469
(58) Field of Classification Search
USPC .......................................... 370/469, 334, 335
See application file for complete search history.

(56) References Cited

U.S. PATENT DOCUMENTS

| | | | | |
|---|---|---|---|---|
| 4,471,379 A | * | 9/1984 | Stephens | 380/226 |
| 4,507,680 A | * | 3/1985 | Freeman | 725/139 |
| 6,567,401 B1 | * | 5/2003 | Kim | 370/352 |
| 7,054,296 B1 | * | 5/2006 | Sorrells et al. | 370/338 |
| 7,194,044 B2 | * | 3/2007 | Birkett et al. | 375/324 |
| 7,395,083 B2 | * | 7/2008 | Buckley | 455/552.1 |
| 7,526,018 B2 | * | 4/2009 | Seo et al. | 375/219 |
| 7,813,385 B1 | * | 10/2010 | Hyun et al. | 370/508 |
| 2004/0165564 A1 | * | 8/2004 | Kim et al. | 370/338 |
| 2005/0113084 A1 | | 5/2005 | Scaglione et al. | |
| 2006/0067271 A1 | | 3/2006 | Chen et al. | |
| 2006/0186973 A1 | * | 8/2006 | Satou | 333/260 |
| 2008/0165736 A1 | * | 7/2008 | Zhao et al. | 370/331 |

FOREIGN PATENT DOCUMENTS

WO   WO 2006/067271 A1   6/2006

* cited by examiner

*Primary Examiner* — Mark Rinehart
*Assistant Examiner* — Mohammad Anwar (57) ABSTRACT

A method includes, in a physical layer of a communication stack of a wireless communication device, receiving a first radio frequency (RF) signal, converting the first RF signal to a first digital data signal, and passing the first digital data signal to a higher communication stack layer. The method also includes, in the physical layer, receiving a second digital data signal from the higher communication stack layer, converting the second digital data signal to a second RF signal, and transmitting the second RF signal. The method further includes, in the physical layer, forwarding a signal, wherein forwarding comprises receiving a third RF signal, converting the third RF signal to a fourth RF signal, and transmitting the fourth RF signal.

21 Claims, 5 Drawing Sheets

METHOD AND APPARATUS FOR PHYSICAL LAYER ROUTING IN A WIRELESS DEVICE

TECHNICAL FIELD

This disclosure relates generally to routing in wireless devices and more specifically to a method and apparatus for PHY layer routing in a wireless device.

BACKGROUND

Many buildings, facilities, and other structures include secure communication networks, which are used for wireless and other types of communications. For example, chemical plants and other industrial facilities often include wireless networks, which can be used for a wide variety of purposes. As particular examples, the wireless networks in industrial facilities could be used to transport data to and from process controllers, process sensors, and process actuators. The wireless networks could also facilitate wireless communications between personnel working in the industrial facilities.

SUMMARY

This disclosure provides a method and apparatus for physical layer routing in a wireless device.

In a first embodiment, a method includes, in a physical layer of a communication stack of a wireless communication device, receiving a first radio frequency (RF) signal, converting the first RF signal to a first digital data signal, and passing the first digital data signal to a higher communication stack layer. The method also includes, in the physical layer, receiving a second digital data signal from the higher communication stack layer, converting the second digital data signal to a second RF signal, and transmitting the second RF signal. The method further includes, in the physical layer, forwarding a signal, wherein forwarding comprises receiving a third RF signal, converting the third RF signal to a fourth RF signal, and transmitting the fourth RF signal.

In particular embodiments, the method further includes receiving a routing message in the physical layer and passing the routing message to a higher communication stack layer, and, in response to the routing message, configuring the wireless communication device for forwarding a signal in the physical layer.

In a second embodiment, an apparatus includes an antenna and a wireless communication device. The wireless communication device is coupled to the antenna and includes a communication stack. The wireless communication device is adapted to, in a physical layer of the communication stack, receive a first radio frequency (RE) signal, convert the first RF signal to a first digital data signal, and pass the first digital data signal to a higher communication stack layer. The wireless communication device is further adapted to, in the physical layer, receive a second digital data signal from the higher communication stack layer, convert the second digital data signal to a second RF signal, and transmit the second RF signal. The wireless communication device is still further adapted to, in the physical layer, forward a signal, wherein forwarding comprises receiving a third RF signal, converting the third RF signal to a fourth RF signal, and transmitting the fourth RF signal.

In a third embodiment, an apparatus includes first and second antennas and a wireless communication device coupled to the first and second antennas. The first and second antennas are directional antennas. The wireless communication device includes a communication stack and is adapted to, in a physical layer of the communication stack, receive a first radio frequency (RF) signal, convert the first RF signal to a first digital data signal, and pass the first digital data signal to a higher communication stack layer. The wireless communication device is further adapted to, in the physical layer, receive a second digital data signal from the higher communication stack layer, convert the second digital data signal to a second RF signal, and transmit the second RF signal. The wireless communication device is still further adapted to, in the physical layer, forward a signal, wherein forwarding comprises receiving a third RF signal via the first antenna and transmitting a corresponding fourth RF signal via the second antenna.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
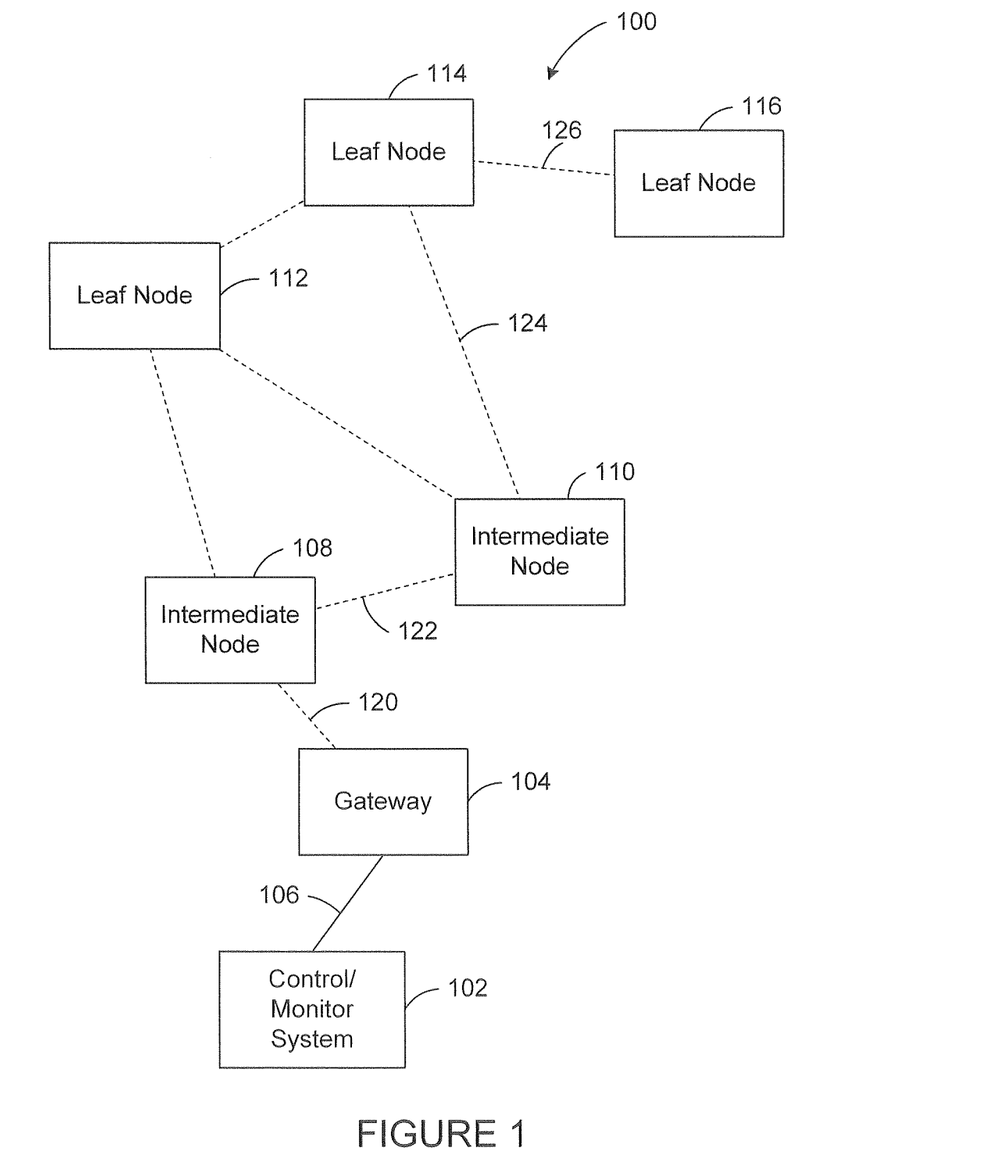
FIG. 1 illustrates a wireless network according to this disclosure.

FIG. 1 illustrates a wireless network 100 according to this disclosure. The embodiment of the network 100 shown in FIG. 1 is for illustration only. Other embodiments of the wireless network 100 may be used without departing from the scope of this disclosure. In general, this embodiment of the wireless network 100 comprises devices that are adapted to forward signals using PHY layer routing. Such devices reduce delays in forwarding signals through a first wireless device that are intended for a second wireless device.

In the wireless network 100, a communication link 106 communicatively couples a control/monitor system 102 to a wireless gateway 104. The communication link 106 is typically a wired link, such as an Ethernet network. The gateway 104 communicatively couples the control/monitor system 102 to the wireless devices of the network 100.

Leaf node wireless devices 112, 114 and 116 are typically sensors and/or actuators that provide monitoring and control of a physical system. Intermediate node wireless devices 108 and 110 are repeater nodes, permitting devices that are not able to communicate directly with the gateway 104 to communicate indirectly. The devices 108, 110, 112, 114 and 116 are capable of wireless communication between themselves and with the gateway 104, as shown in FIG. 1 by broken lines. The ability of two devices to communicate wirelessly depends upon signal strength, interference, and other characteristics of the wireless link between the devices.

Where the control/monitor system 102 communicates with the leaf node 116, a so-called "multi-hop" signal must be routed from the gateway 104 via a wireless link 120 to the intermediate node 108. From the intermediate node 108 it is sent via a wireless link 122 to the intermediate node 110, then via a wireless link 124 to the leaf node 114, then via a wireless link 126 to the leaf node 116.

In a conventional wireless system, each of the wireless devices 108, 110, and 114 fully receives packets of the signal before sending them on to the next wireless device along the path. Such 'receive, process, forward' functionality produces significant delays in the transit time of the packets between leaving the gateway 104 and arriving at the leaf node 116. Using the method and apparatus of the present disclosure, the packets may be forwarded from one device to the next much more quickly, thereby reducing its end-to-end transit time.

Typically, each of the wireless devices 108, 110, 112, 114 and 116 includes a communication protocol stack that conforms to the Open Systems Interconnection Reference Model (the OSI Model). The OSI Model is a layered, abstract description for communications protocol design. Such devices typically include a Physical (PHY) layer, a Data Link layer that includes a Medium Access Control (MAC) portion, and higher levels that may include a Network layer, a Transport layer, and/or an Application layer. Generally, the PHY layer is referred to as the 'lowest' layer, the Application layer as the 'highest' layer and the other layers ranked in the order presented above.

The PHY layer defines all the electrical and physical specifications for a device. The PHY layer also includes hardware that provides connection to a physical communications medium and software that provides contention resolution among devices coupled to the medium and conversion between the signals used within the device and the signals used on the physical communications medium. The MAC layer provides addressing and channel access control mechanisms that enable several such devices to communicate within a multipoint network.

The routing of packets over a multi-hop path in a wireless network is typically a two-step process: first, route discovery and second, routing of packets over discovered route. Route discovery may be either a centralized or a distributed process. Routing messages are typically exchanged when a first message to a new destination is received from an application layer of a node. If the destination is known during node power-up, the routing messages may be exchanged at the time the node joins the network.

If route discovery is a centralized process, a node that has information regarding the communication connectivity (or topology) of the network, for example the gateway 104, assigns a series of nodes for a multi-hop path. If route discovery is a distributed process, it may be performed either in the MAC layer (MAC layer routing) or in the Network layer (Network layer routing) of the intervening nodes. Where MAC layer routing is used, subsequent packets sent along the multi-hop path are processed in the MAC layer of the intervening nodes. Where Network layer routing is used, subsequent packets sent along the multi-hop path are processed in the Network layer of the intervening nodes.

The MAC layer performs two functions when handling packets to be forwarded. First, having received a packet from the PHY layer, the MAC layer sends an acknowledgement of receipt of the packet to the preceding node in the multi-hop path via the PHY layer. Second, code at the MAC layer examines the header in the packet and determines the next node in its journey and passes the packet back to the PHY layer, which transmits it to the next node. Where signals are being sent with the Carrier Sense Multiple Access with Collision Avoidance (CSMA/CA) protocol, transmission of the packet to the next node may be delayed by a random back-off time period employed to avoid collisions with other signals being transmitted at the same time.

Figure 8:
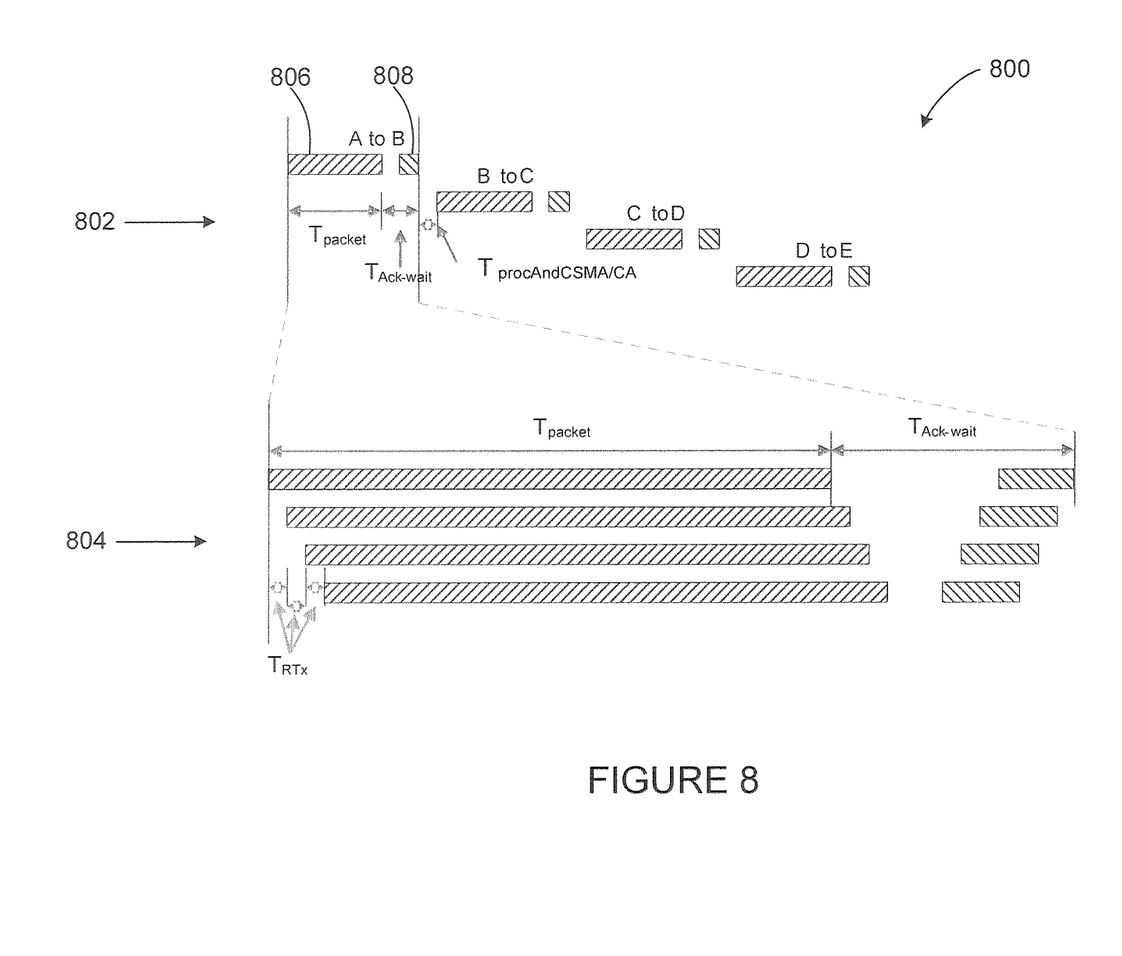
FIG. 8 illustrates a timeline for transmission of a packet over a four-hop path in a conventional network and in a network according to this disclosure.

FIG. 8 shows a timeline for transmission of a packet over a four-hop path in a conventional network, at reference character 802. A time period $T_{packet}$ passes while the packet is transmitted from a gateway to a first node in the path. A time period $T_{Ack-wait}$ then passes while an acknowledgement is sent from the first node to the gateway. A time period $T_{procAndCSMA/CA}$ then passes while the first node determines the address of a second node in the path and begins to send the packet to the second node using the CSMA/CA protocol. Thus, a total time $T_{packet}+T_{Ack-wait}+T_{procAndCSMA/CA}$ elapses between initiation of packet transmission in one node and initiation of transmission of the packet in the next node. As a result, packet transmission time from the gateway to the final node in a conventional network for an N-hop path is approximately $N*(T_{packet}+T_{Ack-wait}+T_{procAndCSMA/CA})$. Furthermore, the transmission time increases by $T_{packet}+T_{Ack-wait}+T_{procAndCSMA/CA}$ for each additional hop.

The network 100 operates using Time Division Multiple Access (TDMA). Route discovery messages exchanged when a route is established inform each node in the network of which slots in a TDMA frame the node will be participating. This information permits the nodes to switch to reduced power operation during slots in which they are not participating, conserving battery power. Using the TDMA protocol also eliminates the CSMA/CA back-off period, as slots are allocated prior to the beginning of a frame.

The network 100 and the devices 108, 110, 112, 114 and 116 of the present disclosure forward packets wholly within the PHY layer, rather than passing packets to the MAC layer for forwarding. This results in a much shorter delay between initiation of packet transmission in one node and initiation of transmission of the packet in the next node. An upper layer (e.g., MAC layer or Network layer) of the node communication stack still performs distributed route discovery, where used. However, according to the discovered routes and activity required in each slot (transmit, receive or forward) of a TDMA frame, the upper layer that performed route discovery will instruct the PHY layer of the node at the beginning of each TDMA frame. Based upon this instruction, the PHY layer will route signals during each slot of that TDMA frame without further intervention by the higher layer.

Reference character 804 indicates a timeline for transmission of a packet over a four-hop path in a network according to the present disclosure. A time period $T_{RTx}$ elapses in each node before transmission to the succeeding node begins. The time $T_{RTx}$ represents a delay in forwarding the packet from the receiver to the transmitter within the PHY layer. A similar delay is experienced by the acknowledgement signal as it is sent from the final node back to the gateway. As a result, packet transmission time from the gateway to the final node in an N-hop path of the network of the present disclosure is significantly less than that of a conventional system, being approximately equal to $T_{packet}+T_{Ack-wait}+2*(N-1)*T_{RTx}$. Furthermore, the transmission time increases by only $2*T_{RTx}$ for each additional hop.

Packets transmitted in the network 100 may be sent with a preamble that is longer than that used for packets in a conventional network. The longer preamble helps in receiver synchronization of all nodes on a multi-hop route in spite of receiver synchronization delay & slot time mismatch on each node The network 100 of the present disclosure is more reliable than a conventional network. In a conventional network, successful transmission of a packet is acknowledged locally for each hop of a multi-hop path. In the network 100 the acknowledgement of successful receipt of the packet is transmitted back from the destination device through all the hops to the gateway or other initiating device.

Although FIG. 1 illustrates one example of a sensor, various changes may be made to FIG. 1. For example, while control/monitor system 102 is shown as a single element, it will be understood that a plurality of devices coupled by a communication network may be used. Further, the control/monitor system 102 could be coupled to the wireless devices via a plurality of wireless gateways. Also, the numbers and types of wireless devices in the network 100 are for illustration only.

Figure 2:
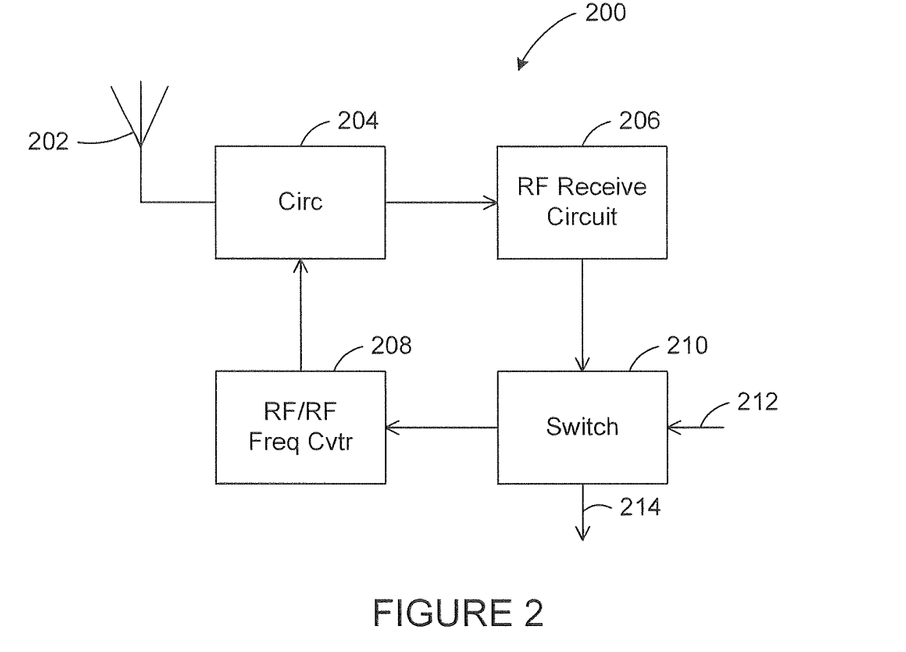
FIG. 2 illustrates a first embodiment of a wireless device according to this disclosure.
Figure 3:
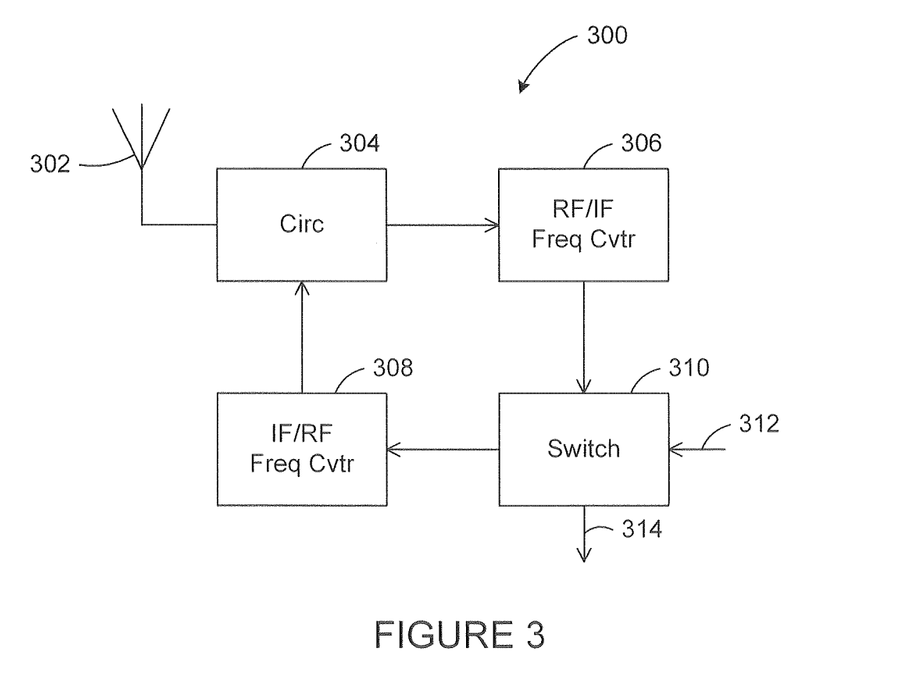
FIG. 3 illustrates a second embodiment of a wireless device according to this disclosure.
Figure 4:
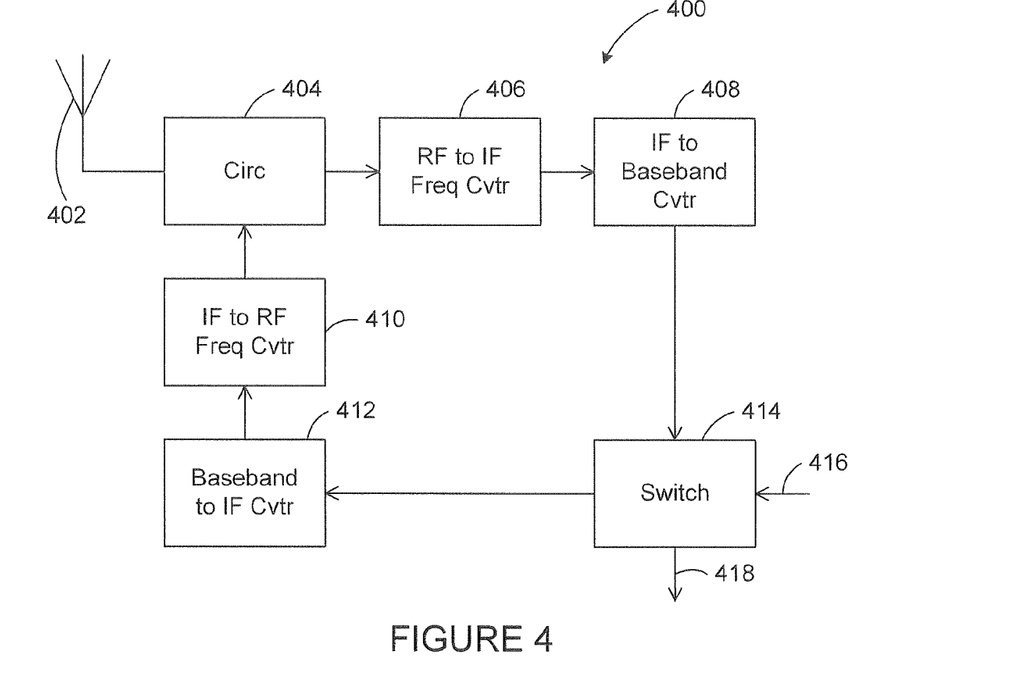
FIG. 4 illustrates a third embodiment of a wireless device according to this disclosure.

FIGS. 2 through 4 depict embodiments of the present disclosure that employ frequency diversity to enable a wireless node to receive and transmit a packet simultaneously. In these embodiments, a node receives a first signal in a first frequency channel and retransmits a related second signal in a second, non-overlapping frequency channel. In the embodiment of FIG. 2, the node converts the first signal into the second signal in a radio frequency (RF) stage. In the embodiment of FIG. 3, the node converts the first signal into the second signal in an intermediate frequency (IF) stage. In the embodiment of FIG. 4, the node converts the first signal into the second signal in a baseband stage.

FIG. 2 shows an RF stage 200 of a transceiver in a wireless device of the network 100. An antenna 202 is used to receive and transmit RF signals. The antenna 202 is coupled to a circulator 204 by means of a bandpass filter tuned to an operating frequency band of the transceiver. The circulator provides for simultaneous transmission and reception on different channels within the operating frequency band. A received first RF signal passes to a receive circuit 206 that may include a low-noise amplifier and an automatic gain control to recondition the received signal. From the circuit 206, the reconditioned first RF signal passes to an input of an RF switch 210 having two inputs and two outputs.

The PHY layer will have received routing instructions at the beginning of a TDMA frame indicating whether packets in each slot of the frame are to be received, transmitted or forwarded. Those instructions are based upon route discovery messages previously received by the node and processed by higher layers of the communication stack. Responsive to those instructions, the transceiver configures the switch 210 at the beginning of each slot responsive to the one or more routing messages. In a first configuration-used when the transceiver is operating as a receiver-the switch 210 couples the reconditioned first RF signal received from the circuit 206 to an output 214. Other PHY layer circuitry of the transceiver converts the first RF signal on the output 214 to digital data that is passed from the PHY layer to the MAC layer for further processing.

In a second configuration-used when the transceiver is operating to forward a message-the switch 210 couples the reconditioned first RF signal received from the circuit 206 to an RF-to-RF frequency convertor 208. The convertor 208 includes a local oscillator and mixer that convert the first RF signal to a second RF signal in a different, non-overlapping frequency channel. The convertor 208 may also include a tunable bandpass filter to remove spurious signals from the mixer, and a power amplifier to drive the antenna 202. The second RF signal from the RF-to-RF frequency convertor 208 is coupled to the antenna 202 through the circulator 204.

In the first configuration of the switch 210, the transceiver may also operate as a transmitter. Digital data sent by the MAC layer to the PHY layer is converted by PHY layer circuits to an RF signal that is received at the switch 210 on an input 212. The switch 210 operates in the first configuration to couple the RF input 212 to the RF-to-RF frequency convertor 208. As occurs when the transceiver is forwarding a message, the convertor 208 converts the RF signal received on the input 212 to a selected frequency channel for transmission via the antenna 202.

FIG. 3 shows an IF stage 300 of a transceiver in a wireless device of the network 100. An antenna 302 is used to receive and transmit RF signals. The antenna 302 is coupled to a circulator 304 by means of a bandpass filter tuned to an operating frequency band of the transceiver. The circulator provides for simultaneous transmission and reception on different channels within the operating frequency band. A received first RF signal passes to an RF-to-IF frequency convertor 306 that may include a low-noise amplifier, an automatic gain control to recondition the received signal, a local oscillator and mixer to convert the first RF signal to a first IF signal, and a bandpass filter to remove spurious signals from the mixer. From the convertor 306, the first IF signal passes to an input of an IF switch 310 having two inputs and two outputs.

In a first configuration-used when the transceiver is operating as a receiver-the switch 310 couples the first IF signal received from the convertor 306 to an output 314. Other PHY layer circuitry of the transceiver converts the first IF signal on the output 314 to digital data that is passed from the PHY layer to the MAC layer for further processing.

In a second configuration-used when the transceiver is operating to forward a message-the switch 310 couples the first IF signal received from the convertor 306 to an IF-to-RF frequency convertor 308. The convertor 308 includes a local oscillator and mixer that convert the first IF signal to a second RF signal in a different, non-overlapping frequency channel than the first RF signal. The convertor 308 may also include a bandpass filter to remove spurious signals from the mixer, and a power amplifier to drive the antenna 302. The second RF signal from the IF-to-RF frequency convertor 308 is coupled to the antenna 302 through the circulator 304.

In the first configuration of the switch 310, the transceiver may also operate as a transmitter. Digital data sent by the MAC layer to the PHY layer is converted by PHY layer circuits to an IF signal that is received at the switch 310 on an input 312. The switch 310 operates in the first configuration to couple the IF input 312 to the IF-to-RF frequency convertor 308. As occurs when the transceiver is forwarding a message, the convertor 308 converts the IF signal received on the input 312 to a selected frequency channel for transmission via the antenna 302.

FIG. 4 shows an RF-IF stage 400 of a transceiver in a wireless device of the network 100. An antenna 402 is used to receive and transmit RF signals. The antenna 402 is coupled to a circulator 404 by means of a bandpass filter tuned to an operating frequency band of the transceiver. The circulator provides for simultaneous transmission and reception on different channels within the operating frequency band. A received first RF signal passes to an RF-to-IF frequency convertor 406 that may include a low-noise amplifier, an automatic gain control to recondition the received signal, a local oscillator and mixer to convert the first RF signal to a first IF signal, and a bandpass filter to remove spurious signals from the mixer. From the RF-to-IF convertor 406, the first IF signal passes to an IF-to-baseband convertor 408 that may include a local oscillator and mixer to convert the first IF signal to a first baseband signal, and a lowpass filter to remove spurious signals from the mixer. From the IF-to-baseband convertor 408, the first baseband signal passes to an input of a baseband switch 414 having two inputs and two outputs.

In a first configuration—used when the transceiver is operating as a receiver—the switch 414 couples the first baseband signal received from the convertor 408 to an output 418. Other PHY layer circuitry of the transceiver converts the baseband signal to digital data and passes the digital data to the MAC layer for further processing.

In a second configuration-used when the transceiver is operating to forward a message-the switch 414 couples the first baseband signal received from the convertor 408 to a baseband-to-IF frequency convertor 412. The convertor 412 includes a local oscillator and mixer that convert the first baseband signal to a second IF signal and a bandpass filter to remove spurious signals from the mixer. The second IF signal from the convertor 412 is passed to an IF-to-RF frequency convertor 410. The convertor 410 includes a local oscillator and mixer that convert the second IF signal to a second RF signal in a different, non-overlapping frequency channel than the first RF signal. The convertor 410 may also include a bandpass filter to remove spurious signals from the mixer, and a power amplifier to drive the antenna 402. The second RF signal from the IF-to-RF frequency convertor 410 is coupled to the antenna 402 through the circulator 404.

In the first configuration of the switch 414, the transceiver may also operate as a transmitter. Digital data sent by the MAC layer to the PHY layer is converted to a baseband signal by the PHY layer. The baseband signal is received at the switch 414 on an input 416. The switch 414 operates in the first configuration to couple the baseband input 416 to the baseband-to-IF frequency convertor 412. As occurs when the transceiver is forwarding a message, the convertor 412 and the convertor 410 convert the baseband signal received on the input 416 to a selected frequency channel for transmission via the antenna 402.

Although FIGS. 2 through 4 illustrate particular examples of PHY layer routing in a wireless device, various changes may be made to the systems shown in FIGS. 2 through 4. For example, any other suitable techniques may be used to convert between RF, IF and baseband signals. Separate receive and transmit antennas may be used, eliminating the need for a circulator.

Figure 5:
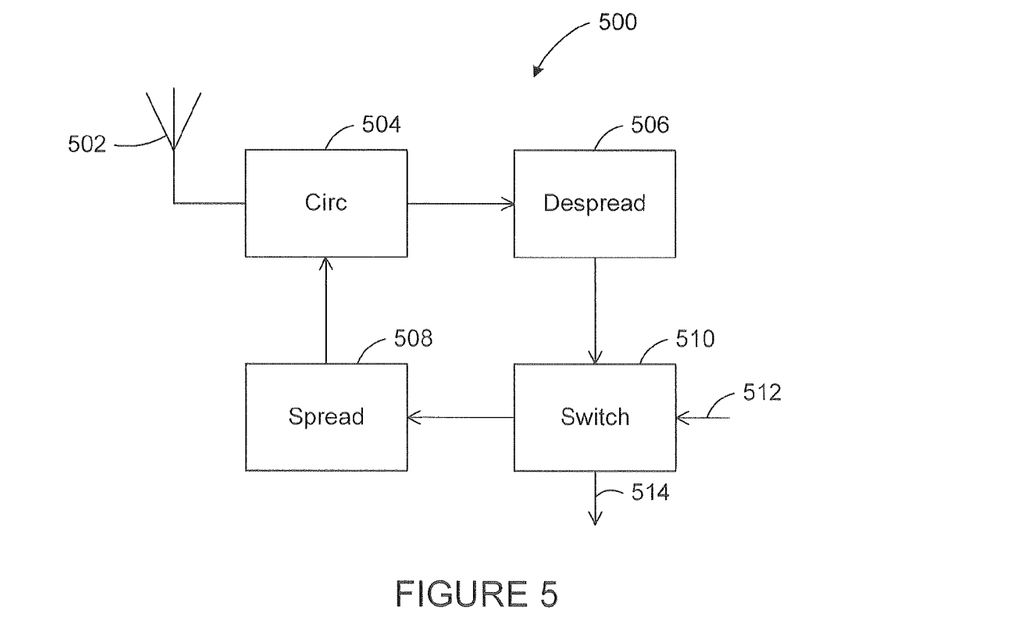
FIG. 5 illustrates a fourth embodiment of a wireless device according to this disclosure.
Figure 6:
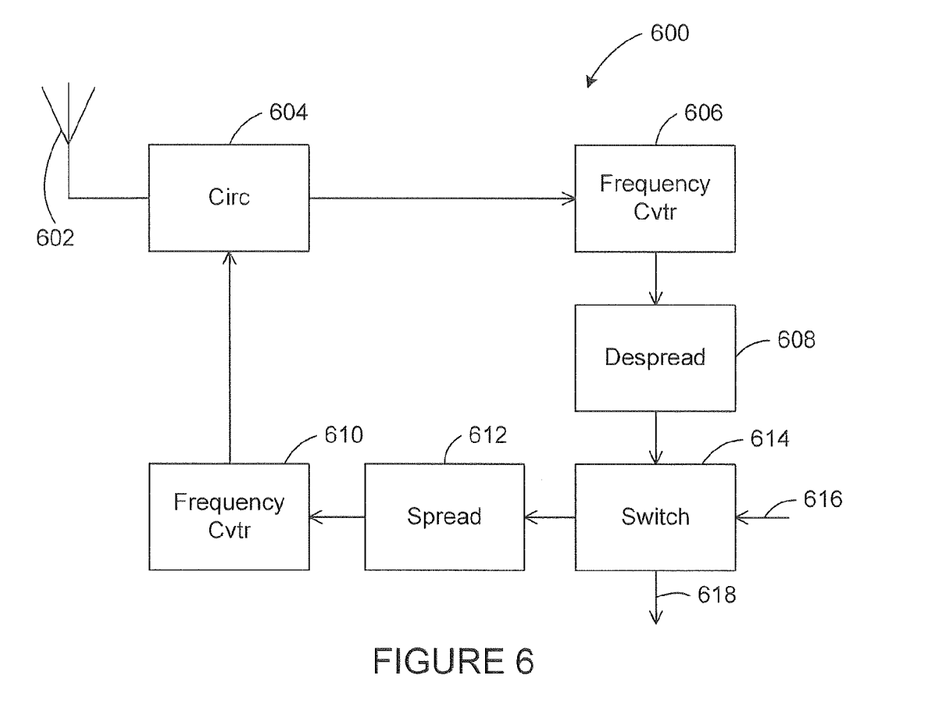
FIG. 6 illustrates a fifth embodiment of a wireless device according to this disclosure.

FIGS. 5 and 6 depict embodiments of the present disclosure that employ code diversity in code division multiple access (CDMA) signaling to enable a wireless node to receive and transmit a packet simultaneously. In these embodiments, a node receives a first signal that is spread using a first code and retransmits a related second signal that is spread using a second code, which is orthogonal to the first code. In the embodiment of FIG. 5, the node converts the first signal into the second signal in an RF stage. In the embodiment of FIG. 6, the node converts the first signal into the second signal in either an IF stage or a baseband stage.

FIG. 5 shows an RF stage 500 of a transceiver in a wireless device of the network 100. An antenna 502 is used to receive and transmit RF signals. The antenna 502 is coupled to a circulator 504 by means of a bandpass filter tuned to an operating frequency band of the transceiver. The circulator provides for simultaneous transmission and reception in an operating frequency band. A received first RF signal passes to a despreading circuit 506 that may include a low-noise amplifier and an automatic gain control to recondition the received signal. The despreading circuit 506 includes a first pseudonoise (PN) sequence generator and a mixer to despread the first RF signal. The first PN sequence generator generates a PN code matching the PN code used to spread the first RF signal. From the circuit 506, the despread first RF signal passes to an input of an RF switch 510 having two inputs and two outputs.

In a first configuration-used when the transceiver is operating as a receiver-the switch 510 couples the despread first RF signal received from the circuit 506 to an output 514. Other PHY layer circuitry of the transceiver converts the first RF signal on the output 514 to digital data that is passed from the PHY layer to the MAC layer for further processing.

In a second configuration-used when the transceiver is operating to forward a message-the switch 510 couples the despread first RF signal received from the circuit 506 to a spreading circuit 508. The circuit 508 includes a second PN sequence generator and mixer that convert the despread first RF signal to a second RF signal that is spread using the second PN code. The second PN code is orthogonal to the first PN code. The spreading circuit 508 may also include a tunable bandpass filter to remove spurious signals from the mixer, and a power amplifier to drive the antenna 502. The second RF signal from the spreading circuit 508 is coupled to the antenna 502 through the circulator 504.

In the first configuration of the switch 510, the transceiver may also operate as a transmitter. Digital data sent by the MAC layer to the PHY layer is converted by PHY layer circuits to an RF signal that is received at the switch 510 on an input 512. The switch 510 operates in the first configuration to couple the RF input 512 to the spreading circuit 508. As occurs when the transceiver is forwarding a message, the circuit 508 spreads the RF signal received on the input 512 using the second PN code for transmission via the antenna 502.

FIG. 6 shows a stage 600 of a transceiver in a wireless device of the network 100. An antenna 602 is used to receive and transmit RF signals. The antenna 602 is coupled to a circulator 604 by means of a bandpass filter tuned to an operating frequency band of the transceiver. The circulator provides for simultaneous transmission and reception in an operating frequency band. A received first RF signal passes to a frequency convertor circuit 606 that may include a low-noise amplifier and an automatic gain control to recondition the received RF signal. The circuit 606 includes one or more local oscillators and mixers that convert the first RF signal to a first IF or baseband signal. The frequency converted signal from the circuit 606 is passed to a despreading circuit 608. The despreading circuit 608 includes a first pseudonoise (PN) sequence generator and a mixer to despread the first IF or baseband signal. The first PN sequence generator generates a PN code matching the PN code used to spread the first IF or baseband signal. From the despreading circuit 608, the despread first IF or baseband signal passes to an input of a switch 614 having two inputs and two outputs.

In a first configuration-used when the transceiver is operating as a receiver-the switch 614 couples the despread first IF or baseband signal received from the circuit 608 to an output 618. Where the frequency convertor 606 produces an IF signal, other PHY layer circuitry of the transceiver converts the despread first IF signal on the output 618 to a baseband signal. Digital data converted from the despread baseband signal produced by either the despreading circuit 608 or the subsequent PHY layer circuitry is passed from the PHY layer to the MAC layer for further processing.

In a second configuration—used when the transceiver is operating to forward a message—the switch 614 couples the despread first IF or baseband signal received from the circuit 608 to a spreading circuit 612. The spreading circuit 612 includes a second PN sequence generator and mixer that convert the despread first IF or baseband signal to a second IF or baseband signal that is spread using the second PN code. The second PN code is orthogonal to the first PN code. The second IF or baseband signal is passed to a frequency convertor circuit 610. The circuit 610 includes one or more local oscillators and mixers that convert the second IF or baseband signal to a second RF signal. The frequency convertor circuit 610 may also include a tunable bandpass filter to remove spurious signals from the one or more mixers, and a power amplifier to drive the antenna 602. The second RF signal from the frequency convertor circuit 610 is coupled to the antenna 602 through the circulator 604.

In the first configuration of the switch 614, the transceiver may also operate as a transmitter. Digital data sent by the MAC layer to the PHY layer is converted by PHY layer circuits to an IF or baseband signal that is received at the switch 614 on an input 616. The switch 614 operates in the first configuration to couple the input 616 to the spreading circuit 612. As occurs when the transceiver is forwarding a message, the spreading circuit 612 spreads the IF or baseband signal received on the input 616 using the second PN code for conversion to RF by the frequency convertor circuit 610 and transmission via the antenna 602.

Although FIGS. 5 and 6 illustrate particular examples of PHY layer routing in a wireless device, various changes may be made to the systems shown in FIGS. 5 and 6. For example, any other suitable techniques may be used to convert between RF, IF and baseband signals. Any other suitable techniques may be used to spread and despread CDMA signals. Separate receive and transmit antennas may be used, eliminating the need for a circulator.

Figure 7:
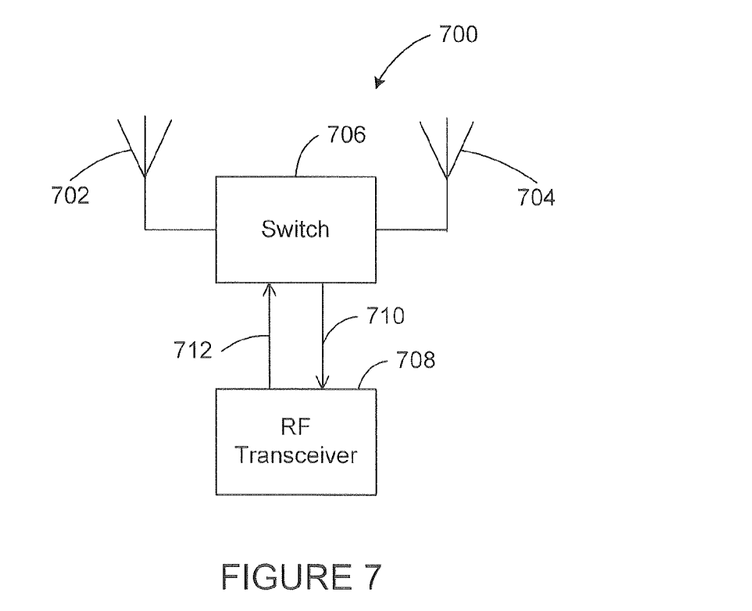
FIG. 7 illustrates a sixth embodiment of a wireless device according to this disclosure.

FIG. 7 depicts an embodiment of the present disclosure that employs spatial diversity to enable a wireless node to receive and transmit a packet simultaneously. In this embodiments, a node receives an RF signal on a first directional antenna and retransmits the signal on a second directional antenna, where the directional characteristics of the first and second antennas minimize reception by the first antenna of signals transmitted by the second antenna.

FIG. 7 shows a wireless device 700 of the network 100. A first directional antenna 702 is used to receive RF signals. The antenna 502 is coupled to a first input of an RF switch 706 that has two inputs and two outputs. A first output of the switch 706 is coupled to a second directional antenna 704. The antennas 702 and 704 are configured so that cross-talk between signals emitted by the antenna 704 and signals received by the antenna 702 are minimized. A second input 712 and a second output 710 of the switch 706 are coupled to an RF transceiver 708 that has a PHY layer and a MAC layer.

In a first configuration-used when the device 700 is operating as a receiver-the switch 706 couples a first RF signal received by the first antenna 702 to the second output 710. Physical layer circuitry of the transceiver 708 converts the first RF signal to digital data that is passed from the PHY layer to the MAC layer for further processing.

In a second configuration—used when the device 700 is operating to forward a message—the switch 706 couples the first RF signal directly to the second antenna 704 for retransmission.

In the first configuration of the switch 510, the device 700 may also operate as a transmitter. Digital data in the transceiver 708 sent by the MAC layer to the PHY layer is converted by PHY layer circuits to an RF signal that is received by the switch 706 at the second input 712. The switch 706 operates in the first configuration to couple the second input 712 to the second antenna 704 for transmission.

It will be understood that in other embodiments of the disclosure, the frequency diversity techniques of FIGS. 2-4, the code diversity techniques of FIGS. 5 and 6, and the spatial diversity techniques of FIG. 7 may be combined. In one embodiment, a transceiver of a wireless device may convert a first RF signal, spread with a first PN sequence, into a second RF signal, spread using a second PN sequence. In this embodiment, the first RF signal is in a different, non-overlapping RF channel than the second RF signal and the first PN sequence is orthogonal to the second PN sequence. In such an embodiment, the capacity of the network may be improved because network can handle more messages at same time. Where two frequency channels and two codes are used, the four distinct combinations may be used simultaneously.

In another embodiment, a transceiver of a wireless device may receive a first RF signal on a first directional antenna and transmit a second RF signal on a second directional antenna, where the first RF signal is spread with a different, orthogonal PN sequence than the second RF signal. In yet another embodiment, a transceiver of a wireless device may receive a first RF signal on a first directional antenna in a first RF channel, spread with a first PN sequence, and transmit a second RF signal on a second directional antenna in a second RF channel, spread with a second PN sequence. In this embodiment, the first and second RF channels are different, non-overlapping RF channels and the first and second PN sequences are different, orthogonal PN sequences.

In a network according to the present disclosure, a signal may be routed from an initiating device to a destination device via multiple paths (or routes), providing communication redundancy in order to improve the robustness of the communication network. In some networks, furthermore, some redundant paths may be unavailable for use due to interference between nodes attempting to use the same frequency or code. A system according to the present disclosure may provide redundancy in such systems by the following techniques. In a system using frequency diversity techniques, different sets of non-overlapping channels may be used in the otherwise unavailable redundant routes. In a system using code diversity, different sets of codes may be used in the otherwise unavailable redundant routes. In a system using both frequency and code diversity techniques, different sets of non-overlapping channels and/or codes may be used in the otherwise unavailable redundant routes. The result of applying the diversity techniques of the present disclosure to redundant routes that would otherwise interfere with each other is that the routes may then be used without such interference.

This use of different channels and/or codes may be achieved during the centralized or distributed route discovery process by exchanging messages among wireless nodes, where the messages identify channels and/or codes that are to be used (or not used) in individual hops of a multi-hop path that is being set up. Subsequently, a signal is sent from the initiating device substantially simultaneously along all redundant paths to the destination device within a single TDMA time slot. Signals from each of the redundant paths will arrive at the destination node substantially simultaneously. Differences in the arrival times of the signals will be a multiple of $T_{RTx}$, proportional to differences in the number of hops in the paths.

A higher layer in the communication stack will have configured the PHY layer of the destination device for receipt during that time slot of the signal using the channels and/or codes of the final hops of the redundant paths. The PHY layer will be configured to receive the signal using the channel and/or code of a preferred one of the redundant paths. If the expected signal is not received on the preferred channel and/or code within a predetermined time after the beginning of the time slot (indicating failure of the preferred path), the PHY layer will reconfigure itself to receive the signal during that time slot using another of the expected channels and/or codes. The use of a lengthened preamble in a network of the present disclosure (as described above) enables the receiver node to switch to a signal coming over an alternative path without losing data from the packet.

In other embodiments of the present disclosure, messages may be sent in a 'broadcast' mode. Where certain nodes are reachable only via multi-hop paths from an initiating device, intervening nodes along the path will both receive and forward such a broadcast message. The switch 210 of FIG. 2 may be configured to operate in a third configuration in which the switch 210 couples the reconditioned first RF signal received from the circuit 206 to both the output 214 and the RF-to-RF frequency convertor 208. As previously described, the convertor 208 converts the first RF signal to a second RF signal for forwarding via the antenna 202. At the same time, other PHY layer circuitry converts the first RF signal on the output 214 to digital data that is passed to the MAC layer. In this way, the node both forwards and receives the message.

The switches 310, 414, 510, 614 and 706 of FIGS. 3-7, respectively, may also operate in such third configurations in other embodiments, in each case providing the ability both to receive and forward signals. It will be understood that in yet other embodiments, such functionality may be provided by a plurality of switches that allow a node both to receive and forward signals.

It may be advantageous to set forth definitions of certain words and phrases used throughout this patent document. The term "couple" and its derivatives refer to any direct or indirect communication between two or more elements, whether or not those elements are in physical contact with one another. The terms "over," "above," and the like denote relative positions of two or more elements in a particular orientation and do not require direct contact between the elements. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   in a physical layer of a communication stack of a wireless communication device, receiving a first radio frequency (RF) signal in a first time slot, converting the first RF signal to a first digital data signal, and passing the first digital data signal to a higher communication stack layer;
   in the physical layer, receiving a second digital data signal from the higher communication stack layer, converting the second digital data signal to a second RF signal, and transmitting the second RF signal; and
   in the physical layer, forwarding a signal by receiving a third RF signal in a second time slot, converting the third RF signal to a fourth RF signal, and transmitting the fourth RF signal, wherein a time period that elapses between the receiving of the third RF signal and the transmitting of the fourth RF signal is substantially equal to a delay in forwarding a packet from a receiver to a transmitter within the physical layer.

2. The method of claim 1, further comprising:
   receiving a routing message in the physical layer and passing the routing message to the higher communication stack layer; and
   in response to the routing message, configuring the wireless communication device for forwarding the signal in the physical layer.

3. The method of claim 1, wherein the routing message comprises configuration information and configuring the wireless communication device for forwarding the signal in the physical layer comprises one of:
   configuring the wireless communication device to receive the third RF signal in a first RF channel and transmit the fourth RF signal in a second RF channel, wherein the first RF channel is different than the second RF channel and the first and second RF channels are selected according to the configuration information; and
   configuring the wireless communication device to despread the third RF signal using a first code and generate the fourth RF signal by spreading the despread signal using a second code, wherein the first code is different than the second code, and the first and second codes are selected according to the configuration information.

4. The method of claim 1, wherein converting the third RF signal to the fourth RF signal in the physical layer comprises:
   converting the third RF signal to one of a baseband signal and an intermediate frequency signal; and
   converting one of the baseband signal and the intermediate frequency signal to the fourth RF signal.

5. The method of claim 1, wherein:
   the third RF signal is received in a first RF channel; and
   the fourth RF signal is transmitted in a second RF channel, wherein the first RF channel is different than the second RF channel.

6. The method of claim 1, wherein converting the third RF signal to the fourth RF signal in the physical layer comprises:
   despreading the third RF signal using a first code; and
   generating the fourth RF signal by spreading the despread signal using a second code,
   wherein the first code is different than the second code.

7. The method of claim 6, wherein:
   the third RF signal is received using a first directional antenna; and
   the fourth RF signal is transmitted using a second directional antenna, wherein the first directional antenna is different than the second directional antenna.

8. The method of claim 6, wherein:
the third RF signal is received in a first RF channel; and
the fourth RF signal is transmitted in a second RF channel, wherein the first RF channel is different than the second RF channel.

9. The method of claim 1, wherein the first and second time slots are time slots in a Time Division Multiple Access (TDMA) frame.

10. An apparatus, comprising:
a wireless communication device configured to be coupled to an antenna, the wireless communication device comprising a communication stack, wherein the wireless communication device is adapted to:
    in a physical layer of the communication stack, receive a first radio frequency (RF) signal in a first time slot, convert the first RF signal to a first digital data signal, and pass the first digital data signal to a higher communication stack layer;
    in the physical layer, receive a second digital data signal from the higher communication stack layer, convert the second digital data signal to a second RF signal, and transmit the second RF signal; and
    in the physical layer, forward a signal by receiving a third RF signal in a second time slot, converting the third RF signal to a fourth RF signal, and transmitting the fourth RF signal, wherein a time period that elapses between the receiving of the third RF signal and the transmitting of the fourth RF signal is substantially equal to a delay in forwarding a packet from a receiver to a transmitter within the physical layer.

11. The apparatus of claim 10, wherein the wireless communication device is further adapted to:
in the physical layer, receive and forward a second signal by:
    receiving a fifth RF signal, converting the fifth RF signal to a third digital data signal, and passing the third digital data signal to a higher communication stack layer; and
    converting the fifth RF signal to a sixth RF signal, and transmitting the sixth RF signal.

12. The apparatus of claim 10, wherein the wireless communication device is further adapted to:
convert the third RF signal to one of a baseband signal and an intermediate frequency signal; and
convert one of the baseband signal and the intermediate frequency signal to the fourth RF signal.

13. The apparatus of claim 10, wherein the wireless communication device is further adapted to:
receive the third RF signal in a first RF channel; and
transmit the fourth RF signal in a second RF channel, wherein the first RF channel is different than the second RF channel.

14. The apparatus of claim 10, wherein the wireless communication device is further adapted to:
despread the third RF signal using a first code; and
generate the fourth RF signal by spreading the despread signal using a second code,
wherein the first code is different than the second code.

15. The apparatus of claim 14, wherein:
the antenna comprises a first directional antenna, and the wireless communication device is further adapted to:
    receive the third RF signal using the first directional antenna; and
    transmit the fourth RF signal using a second directional antenna,
wherein the first directional antenna is different than the second directional antenna.

16. The apparatus of claim 14, wherein the wireless communication device is further adapted to:
receive the third RF signal in a first RF channel; and
transmit the fourth RF signal in a second RF channel, wherein the first RF channel is different than the second RF channel.

17. The apparatus of claim 16, wherein the antenna comprises a first directional antenna, and the wireless communication device is further adapted to:
receive the third RF signal using the first directional antenna; and
transmit the fourth RF signal using a second directional antenna,
wherein the first directional antenna is different than the second directional antenna.

18. An apparatus comprising:
a first antenna, wherein the first antenna is a directional antenna;
a second antenna, wherein the second antenna is a directional antenna; and
a wireless communication device coupled to the first antenna and the second antenna, the wireless communication device comprising a communication stack, wherein the wireless communication device is adapted to:
    in a physical layer of the communication stack, receive a first radio frequency (RF) signal in a first time slot, convert the first RF signal to a first digital data signal, and pass the first digital data signal to a higher communication stack layer;
    in the physical layer, receive a second digital data signal from the higher communication stack layer, convert the second digital data signal to a second RF signal, and transmit the second RF signal; and
    in the physical layer, forward a signal by receiving a third RF signal via the first antenna in a second time slot and transmitting a corresponding fourth RF signal via the second antenna, wherein a time period that elapses between the receiving of the third RF signal and the transmitting of the fourth RF signal is substantially equal to a delay in forwarding a packet from a receiver to a transmitter within the physical layer.

19. The apparatus of claim 18, wherein the wireless communication device is further adapted to:
receive a routing message in the physical layer and pass the routing message to the higher communication stack layer; and
in response to the routing message, configure the wireless communication device for forwarding the signal in the physical layer.

20. The apparatus of claim 18, wherein the wireless communication device is further adapted to:
despread the third RF signal using a first code; and
generate the fourth RF signal by spreading the despread signal using a second code,
wherein the first code is different than the second code.

21. The apparatus of claim 20, wherein the wireless communication device is further adapted to:
receive the third RF signal in a first RF channel; and
transmit the fourth RF signal in a second RF channel, wherein the first RF channel is different than the second RF channel.

* * * * *